Sept. 26, 1939.     J. C. McCUNE     2,173,946
RETARDATION CONTROLLER
Original Filed March 31, 1934    2 Sheets-Sheet 2

INVENTOR
JOSEPH C. McCUNE
BY *Wm. M. Cady*
ATTORNEY

Patented Sept. 26, 1939

2,173,946

UNITED STATES PATENT OFFICE 2,173,946

RETARDATION CONTROLLER

Joseph C. McCune, Edgewood, Pa., assignor to The Westinghouse Air Brake Company, Wilmerding, Pa., a corporation of Pennsylvania Application March 31, 1934, Serial No. 718,376
Renewed November 24, 1936

33 Claims. (Cl. 303—21)

This invention relates to retardation controllers, and in particular to retardation controllers for traction vehicles, railway trains, and the like.

In the operation of traction vehicles and railway trains, particularly those intended for high speed service, it is highly desirable that both the rate of acceleration and rate of deceleration of the vehicle or train be controlled automatically, so that the starting and stopping of the vehicle or train may not be wholly dependent on the skill of the operator. On the other hand, it is also desirable that such automatic control of acceleration and deceleration provide for manual control by the operator when occasion demands it.

It is, therefore, a principal object of my invention to provide a device which is adaptable to the control of both acceleration and deceleration of a traction vehicle or railway train.

In certain types of vehicles driving motors are provided on each axle, while in others driving motors are provided only on certain axles. In the case of railway trains, a single locomotive usually provides the motive power for the entire train. In all of these cases, however, brakes are usually provided on the wheels of each axle, so that while individual wheels, or pairs of wheels, on each vehicle, may not slip during acceleration, they may do so during deceleration when the brakes are applied.

It is, therefore, of considerable importance that the application of the brakes be so controlled as to minimize the possibility of or wholly prevent individual wheel sliding, and accordingly in carrying out my invention I have sought to provide a controller device which is simple and inexpensive enough to be applied to each axle of a vehicle, and which can be arranged to not only control the brakes on each axle throughout the train to produce a desired rate of retardation, but which can also be arranged to control the brakes locally so as to minimize the danger of wheel sliding.

A further object of my invention is, therefore, to provide a device which will detect the tendency of a wheel to slide, and means controlled by the device to reduce the braking effect on that wheel so as to prevent wheel sliding.

A still further object of my invention is to provide apparatus responsive to wheel slipping, i. e. to the tendency of a wheel to slide, which functions to diminish the braking effect on that wheel until the tendency of the wheel to slide is eliminated, and which thereafter causes the braking effect to be increased up to the limit which will not quite produce wheel sliding.

A yet further object of the invention is to provide apparatus for warning the operator when wheels begin to slip, and when they have quit slipping.

Still further objects of the invention will be apparent from the following description, which has been illustrated by several embodiments in the attached drawings, in which.

Figure 1:
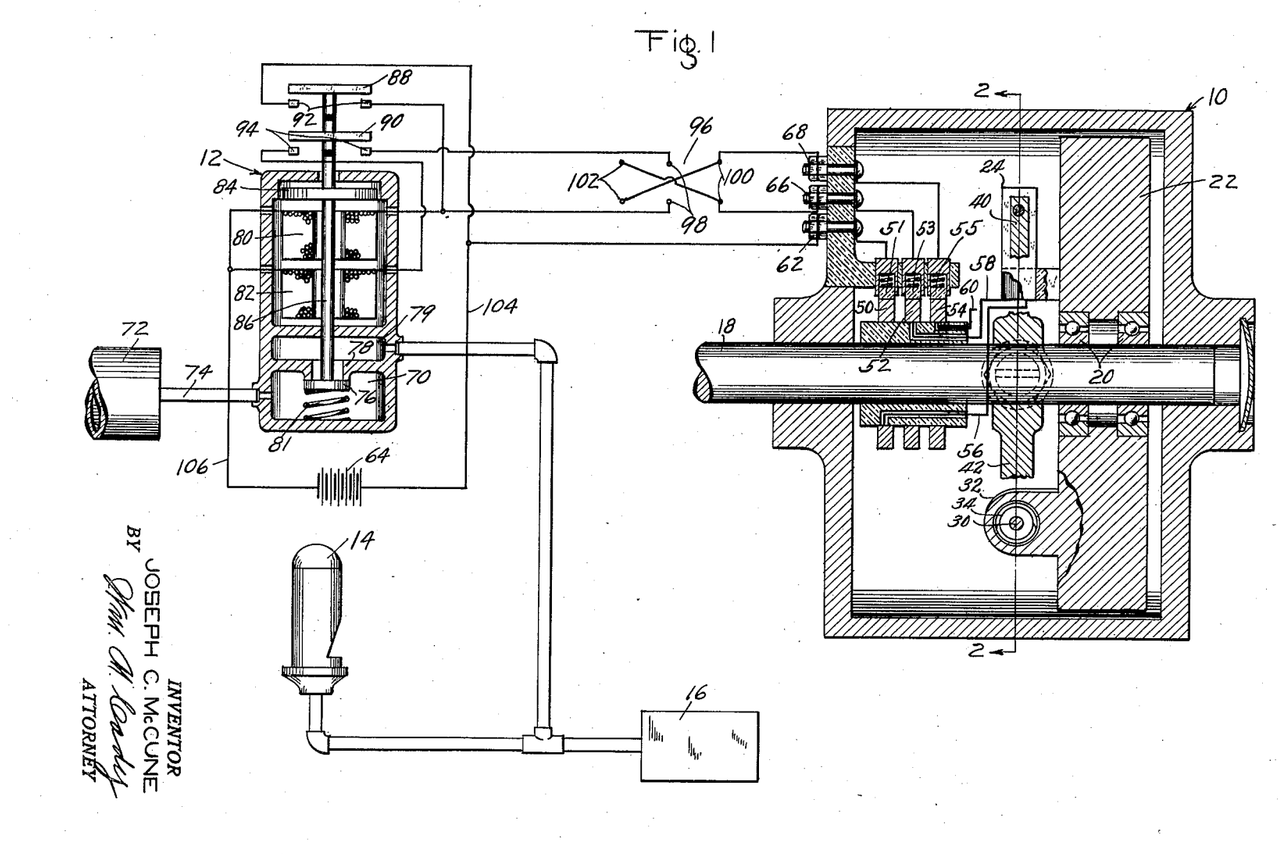
Fig. 1 is a diagrammatic embodiment of the invention in connection with means for warning the operator in the event of wheel slipping or excessive retardation.
Figures 2, 3:
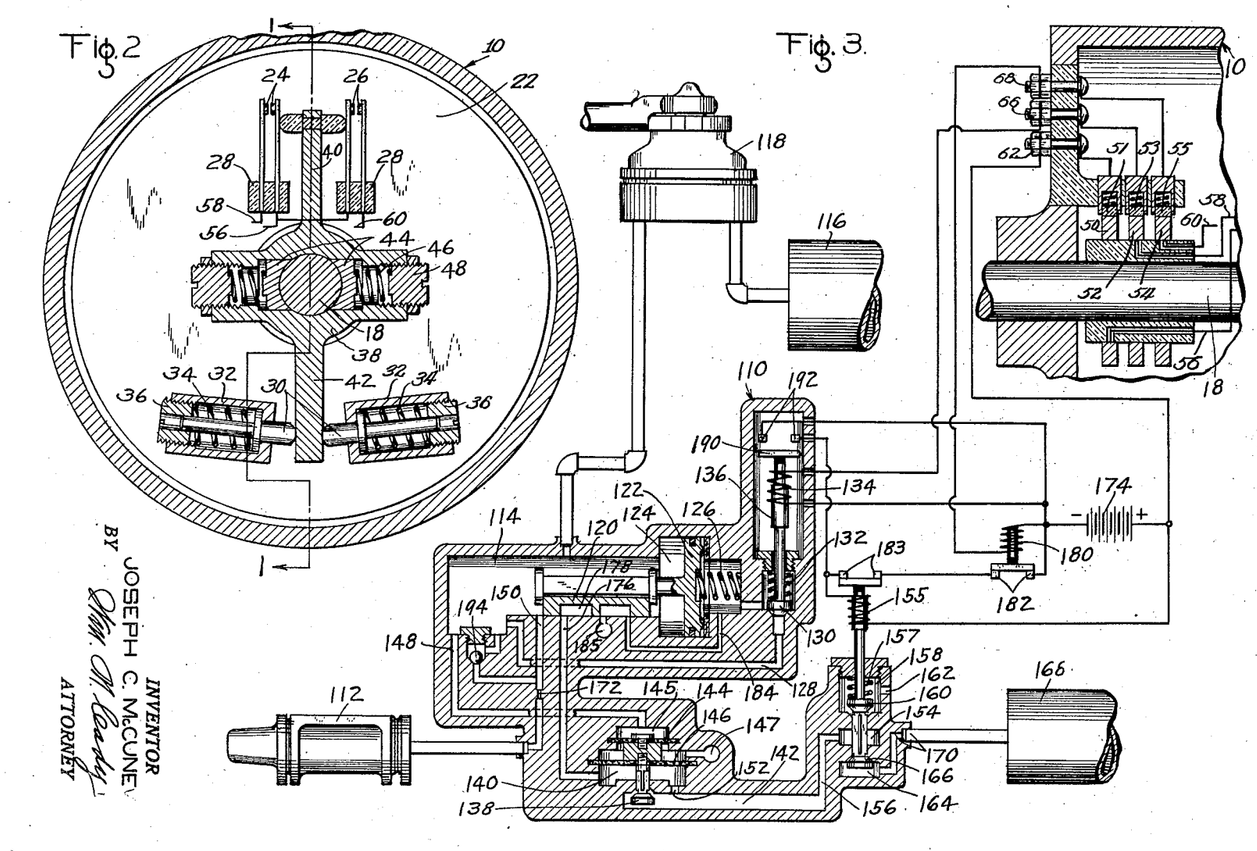
Fig. 2 is a view of the inertia controlled device shown in Fig. 1, along the line 2—2, the view in Fig. 1 being taken along the line 1—1 of Fig. 2.
Fig. 3 is a diagrammatic embodiment of the invention shown in connection with controlling applications of the brakes.

In the embodiment illustrated in both Figs. 1 and 3, only one inertia controlled device 10 has been shown, but, as the description of the invention proceeds, it will be apparent that one of these devices may be provided for each axle of each vehicle, or according to any other arrangement desired.

Referring now particularly to Fig. 1, there is shown an inertia controlled device 10 adapted to control a magnet valve device 12, which in turn controls the supply of fluid under pressure to a whistle device 14 and a sanding device 16.

The inertia controlled device is embodied in a housing provided with a shaft 18, which is connected to or forms part of a vehicle axle, and on which is rotatably disposed through ball bearings 20, or other anti-friction means, a fly wheel body 22. Carried by the fly wheel body 22 are normally open contacts 24 and 26, which are insulated from the fly wheel body by insulating members 28.

Also carried by the fly wheel body are spring-pressed plungers 30, each of which is disposed in a housing 32 provided with a spring 34 which urges the plunger 30 therein outwardly of the housing. An adjusting nut 36 is also provided in each housing for regulating tension on the spring 34 therein.

Also disposed on the shaft 18 is an arm-carrying member 38 provided with a contact operating arm 40 and a motion transmitting arm 42.

The arm-carrying member 38 is provided with friction shoes 44, which are urged into engagement with the shaft 18 by springs 46, tension on the springs being adjustable by adjusting members 48.

It is to be understood that the arrangement shown is intended to provide a relation between the arm-carrying member 38 and the shaft 18 such that for one adjustment of the tension on the springs 46, the arm-carrying member 38 may be relatively rigidly held to the shaft 18, so as to require considerable force to cause relative movement therebetween; and for other adjustments of the tension on the springs 46, the arm-carrying member 38 may be caused to move relative to the shaft under a smaller degree of force. The purpose of this will appear presently.

The motion transmitting arm 42, of the arm-carrying member 38, is positioned between the ends of the spring-pressed plungers 30, so that upon rotation of the shaft 18, motion is transmitted to the fly wheel body 22 by engagement of this arm with one of the spring-pressed plungers 30.

The contact operating arm 40 is positioned with respect to the contacts 24 and 26, such that when the shaft 18 is rotated with respect to the fly wheel body 22 in one direction, the arm will close contacts 24, and when rotated with respect to the fly wheel body in an opposite direction, contacts 26 will be closed.

The tension on the springs 34 may be adjusted so that when the shaft 18 and the fly wheel body 22 are urged at substantially the same speed of rotation, neither of the springs 34 is appreciably compressed, but when either shaft 18 or the fly wheel body 22 is urged at a speed greater or less than the other, the contact operating arm 40 may close either contacts 24 or 26, depending upon the direction of and relative movement between shaft and fly wheel body.

Also carried by the shaft 18 are three slip rings 50, 52 and 54. Engaging the slip rings, respectively, are spring-pressed brushes 51, 53 and 55. The purpose of these slip rings and brushes is to provide electrical connections between each of the contacts 24 and 26 and external circuits.

The slip ring 50 is connected to one of each of contacts 24 and 26 by conductor 56, and slip ring 52 is connected to one of contacts 24 by conductor 58, while slip ring 54 is connected to one of contacts 26 by conductor 60.

The brush 51 is connected to an outlet terminal 62, which has external connection with a source of current supply, as for example a battery 64, and the brush 53 is connected to a similar outlet terminal 66, while the other brush 55 is connected to another outlet terminal 68. The contacts 24 and 26, therefore, serve to connect the source of current supply with external circuits, as will appear presently.

The magnet valve device 12 is embodied in a casing provided with a valve chamber 70 having communication with a source of fluid under pressure, as for example a reservoir 72, by way of pipe 74.

Disposed in the valve chamber 70 is a valve 76 which is urged toward a seat 78 by a spring 81. The valve 76 controls the flow of fluid under pressure from the valve chamber 70, and the reservoir 72, to a supply chamber 79, which is in continuous communication with the whistle device 14 and the sanding device 16.

Disposed in the upper part of the casing embodying the magnet valve device are electromagnets 80 and 82. The windings of these two electromagnets are wound oppositely, so that when current is supplied to one electromagnet, it will attract theretoward an armature 84 secured to valve stem 86, to unseat the valve 76, and when equal currents are supplied to both electromagnets simultaneously, the magnetic flux of one is neutralized by the magnetic flux of the other, so that the valve 76 remains seated by its spring 81.

Carried by an extension of the valve stem 86, and insulated therefrom and from each other, are movable contacts 88 and 90. The contact 88 is adapted to engage stationary contacts 92, while the contact 90 is adapted to engage similar stationary contacts 94. When the valve 76 is in seated position, both movable contacts are out of engagement with their associated stationary contacts. When the valve 76 is in unseated position, both movable contacts are in engagement with their associated stationary contacts.

As before stated, the inertia controlled device 10 controls operation of the magnet valve device 12. In order to provide for similar control for either direction of travel of vehicle or train, there has been provided a reversing switch 96, having common contacts 98 and directional contacts 100, and 102.

Assuming now that the vehicle or train is traveling in what will be called a forward direction, the reversing switch 96 is thrown to connect contacts 98 with contacts 100. If the speed of the vehicle is such that the shaft 18 and the fly wheel body 22, of the inertia controlled device 10, are urged at substantially the same speed, both contacts 24 and 26 will be open.

If now the brakes are applied, so that the speed of the shaft 18 is diminished, the stored energy in the fly wheel body 22 will urge it to rotate at the same speed as obtaining just before the brakes were applied. Assuming that the fly wheel body is rotating in a clockwise direction, as viewed in Fig. 2, and that it is relatively rigidly held to shaft 18, its tendency to continue its speed will compress the right hand plunger spring 34 against opposition of the motion transmitting arm 42, thus causing the contact operating arm 40 to close contacts 24.

Closing of contacts 24 completes a circuit from the battery 64 to the upper electromagnet 80 in the magnet valve device, by way of conductor 104, outlet terminal 62, brush 51, slip ring 50, conductor 56, contacts 24, conductor 58, slip ring 52, brush 53, outlet terminal 66, lower contacts 98 and 100 of the reversing switch 96, and to the electromagnet 80, the return circuit to the battery 64 being effected through conductor 106.

Energization of the electromagnet 80 attracts the armature 84 downwardly to unseat valve 76. Fluid then flows from reservoir 72 to both the whistle device 14 and the sanding device 16. The whistle device warns the operator of what has taken place, while the sanding device acts to deposit sand on the rails.

When the armature 84 moves downwardly this causes movable contact 88 to engage stationary contacts 92, and movable contact 90 to engage stationary contacts 94. The former completes a holding circuit for the electromagnet 80, and thereby maintains it energized independently of subsequent operation of contacts 24 of the inertia controlled device 10. The whistle device and sanding device thus continue to operate so long as valve 76 is held in unseated position. Engagement of movable contact 90 with stationary contacts 94 provides an incompleted circuit for the lower electromagnet 82, as will hereinafter more fully be taken up.

Now the tension on the springs 34 may be adjusted to indicate either a definite rate of retardation, or a slipping condition of the wheels. If it is desired to give warning that a certain rate of retardation has been reached, so that the operator may control the brakes accordingly, the tension of the springs 34 is adjusted so that the movement of the fly wheel body 22 with respect to the shaft 18 will be just sufficient, at this rate of retardation, to effect closing of contacts 24.

If it is desired to indicate a slipping condition of the wheels, so that the operator may release the brakes, the tension of the springs may be adjusted so that a larger speed differential between the fly wheel and shaft will be required to effect closing of contacts 24.

If it is desired to indicate only a definite rate of retardation, the whistle device 14 only may be used, but if it is desired to also indicate and help correct a slipping condition of the wheels, the sanding device also may be used, so as to increase the adhesion between wheels and rails.

If now the shaft 18 is urged at a speed greater than that of the fly-wheel body 22, as would occur when wheels which slip commence to accelerate in speed toward that corresponding to vehicle speed, the motion transmitting arm 42 will compress the left hand plunger spring 34, and the contact operating arm 40 will close contacts 26.

Closing of contacts 26 effects a circuit from the battery 64 to the lower electromagnet 82, by way of conductor 104, outlet terminal 62, brush 51, slip ring 50, conductor 56, contacts 26, conductor 60, slip ring 54, brush 55, outlet terminal 68, upper contacts 98 and 100 of the reversing switch 96, contacts 90 and 94 of the magnet valve device, which were closed when electromagnet 80 was energized, and to the electromagnet 82, the return circuit to the battery 64 being also through conductor 106.

Energization of electromagnet 82 neutralizes the attraction of the electromagnet 80 for the armature 84, so that spring 81 again seats the valve 76, to cut off the flow of fluid to the whistle device and sanding device. At the same time, movable contacts 88 and 90 move out of engagement with their associated stationary contacts, so that both electromagnets are deenergized.

If the vehicle or train is traveling in an opposite direction to that assumed, reversing switch 96 is operated to connect contacts 98 with contacts 102, whereupon the operation for the new direction of travel will be the same as that just described, except that contacts 26, of the inertia controlled device 10, are now operated before contacts 24.

If the tension on the springs 46 of the arm-carrying member 38 is adjusted to permit the arm-carrying member to move relative to the shaft 18, when a sufficient force is applied thereto, then when the fly wheel body is urged at a speed greater than the shaft, the fly wheel body may actually overspeed the shaft and carry with it the arm-carrying member 38.

In such a case the pull exerted on the arm-carrying member 38, through the friction shoes 44 rubbing on shaft 18, will cause the member to actuate the contacts as before, but since the fly wheel body overruns the shaft, the contacts are held closed after the shaft 18 has ceased to rotate, as when the wheels are sliding and the shaft is locked.

When springs 46 are thus adjusted, a more simplified form of magnet valve device may be used in place of that shown. Since for a forward direction of travel contacts 24 will be held closed until shaft 18 again rotates at some speed relative to that of the fly wheel body, this arrangement will permit dispensing with the contacts 26, except for a reverse direction of travel, and the use of a single winding magnet valve device, without requiring the contacts 88, 90, 92, and 94.

When, in such a case, the rate of retardation exceeds that for which tension on springs 34 has been adjusted, or when the wheels commence to slip or slide, contacts 24 will be held closed, and the magnet valve device will be energized to supply fluid under pressure to the whistle device and the sanding device. When the speed of shaft 18 approaches a predetermined value near that of the fly wheel body, the contacts 24 will be opened and the magnet valve device will be de-energized to cut off the supply.

It will thus be seen that with the arm-carrying member 38 rigidly secured to shaft 18 an arrangement such as shown in Fig. 1 may be used, but with the arm-carrying member movable with respect to shaft 18 a more simplified arrangement may be employed.

Considering now the embodiment shown in Fig. 3, the inertia controlled device 10, as described in connection with Figs. 1 and 2, may be employed to control operation of a valve device 110, which is adapted to control the supply of fluid under pressure to and its release from a brake cylinder 112.

The valve device 110 is embodied in a casing provided with a slide valve chamber 114, to which fluid may be supplied from a main reservoir 116 through operation of a brake valve device 118, which may be of any of the usual types, and for the purposes of this disclosure may be taken as a rotary valve type having the usual release, application, and lap positions.

Disposed in the slide valve chamber 114 is a slide valve 120, which is adapted to control the flow of fluid under pressure from the chamber 114 to brake cylinder 112, and to release fluid pressure from the brake cylinder to the atmosphere.

For operating the slide valve 120 there is provided a piston 122 operatively mounted in a piston chamber 124. The piston 122 is subject on one side to the pressure in chamber 114 and on the other side to the combined pressure of a spring 126 and fluid in chamber 124 to the right of the piston. When the fluid pressure in slide valve chamber 114 is sufficient to actuate piston 122 to the right against opposition of spring 126, the slide valve 120 is in application position. When the fluid pressures on both sides of the piston 122 are substantially equal, the spring 126 actuates the piston to release position.

In application position, the portion of piston chamber 124 to the right of piston 122 is in communication with the atmosphere through passage 184 and exhaust port 185.

The slide valve chamber 114 may be in communication with the portion of piston chamber 124 to the right of piston 122 by way of a passage 128. For controlling the flow of fluid through this passage there is provided a valve 130, which is urged toward seated position by a spring 132, and toward unseated position by an electromagnet 134, which when energized attracts a core 136 upwardly to unseat the valve.

Disposed in the lower part of the valve device casing is a by-pass valve 138, which is adapted to control the flow of fluid from a chamber 140 above the valve to a chamber 142 below the valve. The valve 138 is secured through its stem to spaced diaphragms 144 and 146. A chamber 145 above diaphragm 144 is in communication with the slide valve chamber 114, by way of passage 148, while the chamber 140 below diaphragm 146 is adapted to be connected with a passage 150 leading to the brake cylinder 112. The chamber between the diaphragms is connected to the atmosphere through port and passage 147.

The by-pass valve 138 is held unseated when the pressure acting upon diaphragm 144 from chamber 145 exceeds that acting upon diaphragm 146 from chamber 140. When the pressure acting upon diaphragm 146 exceeds that acting upon diaphragm 144, valve 138 is seated, and fluid must thereafter flow from chamber 140 to chamber 142, or vice versa, by way of a restricted port 152. The by-pass valve 138, therefore, controls the rate of flow of fluid between chambers 140 and 142, for a purpose which will appear presently.

The valve device 110 is also provided with a flow chamber 154, which is connected with the aforementioned chamber 152 by way of passage 156. Above chamber 154 is a release valve chamber 158, in which is disposed a release valve 160 adapted to control the flow of fluid under pressure from the flow chamber 154 to the atmosphere, by the way of port 162.

Below the flow chamber 154 is a supply valve chamber 164, in which is disposed a supply valve 166 adapted to control the supply of fluid under pressure from a supply reservoir 168, or the main reservoir 116, to the flow chamber 154, by way of pipe and passage 170.

Release valve 160 is urged toward seated position and supply valve 166 toward unseated position by a spring 157, and toward unseated and seated positions, respectively, by an electromagnet 155 which is normally energized to hold the valves so.

In the operation of this embodiment, an application of the brakes is effected by moving the handle of the brake valve device 118 to application position, whereupon fluid under pressure flows from the main reservoir 116, through the brake valve device, to the slide valve chamber 114 in the valve device 110. Fluid pressure in the slide valve chamber 114 actuates the slide valve piston 122 to the right, to the position shown in Fig. 3. Fluid under pressure then flows from the slide valve chamber 114 to the brake cylinder 112 through brake cylinder passage 150, which is provided with a restriction 172.

At the same time, fluid under pressure flows to the chamber 145 above the diaphragm 144, by way of passage 148, and the pressure acting on this diaphragm holds the by-pass valve 138 in unseated position.

Assuming that the inertia controlled device 10 is adjusted to prevent wheel sliding and that the arm-carrying member 38 is relatively rigidly held to shaft 18, should the wheels to which shaft 18 is coupled begin to slip, contacts 24 will be closed, as before (assuming the same direction of rotation as before), and a circuit will be completed from a battery 174 to the electromagnet 134 in the valve device 110.

Energization of this electromagnet unseats the valve 130, which permits fluid to flow from the slide valve chamber 114 to the piston chamber 124, to the right of piston 122. As soon as the pressures on either side of the piston have substantially equalized, spring 128 will have actuated the piston to the left, causing the slide valve 120 to be moved to release position.

In release position, the slide valve 120 disconnects passage 150 leading to the brake cylinder from the slide valve chamber 114, and reconnects passage 150 with a passage 176 leading to the aforementioned chamber 140 below the diaphragm 146.

Fluid under pressure in the brake cylinder then flows to the atmosphere, by way of passage 150, cavity 178 in the slide valve 120, passage 176, chamber 140, past the unseated by-pass valve 138, as well as through the restricted port 152, chamber 142, passage 156, chamber 154, past the unseated release valve 160, and to the atmosphere through port 162.

Experience teaches that in order to release the brakes on slipping or sliding wheels sufficiently to permit the wheels to pick up speed and again rotate at normal speed, the brake cylinder pressure must be reduced to a low value, which depends upon speed of the vehicle when slipping commenced, rail conditions, and other factors. In most cases however the brake cylinder pressure must be reduced well below half the brake cylinder pressure which caused slipping. It is to be here understood that the brake cylinder pressure will be reduced fast enough to prevent a locked-wheel condition, so that the wheels do not actually cease rotating but merely rotate below normal speed.

When the brakes have been released sufficiently to permit the wheels to again rotate at normal speed, contacts 24 will be opened, and rotation of axle 18 will tend to overspeed the rotation of the fly wheel body 22, and thereby close contacts 26.

When contacts 24 are opened, the electromagnet 134 is deenergized, whereupon valve 130 is again seated by spring 132. Communication between piston chamber 124 to the right of piston 122 is maintained with the slide valve chamber 114 by the small leakage passage 184, so that the slide valve 120 is held in release position.

Closing of contacts 26 energizes a relay 180 to open contacts 182. Opening of contacts 182 deenergizes the electromagnet 155, and release valve 160 is seated and supply valve 166 unseated by spring 157. The release of fluid pressure from the brake cylinder is thus cut off and fluid under pressure then flows from the supply reservoir 168, through pipe and passage 170, past the unseated supply valve 166, to the fluid chamber 154, from whence it flows by the already described passages to the brake cylinder.

When the pressure acting upon diaphragm 146 from chamber 140 has overbalanced that acting upon diaphragm 144 from chamber 145, the diaphragms are urged upwardly to seat the by-pass valve 138. Thereafter the flow of fluid to the brake cylinder from the supply reservoir 168 takes place at a slower rate.

The seating of the by-pass valve 138 may be caused to take place at any desired pressure. For example, the area of diaphragm 146 may be proportioned with respect to the area of diaphragm 144, so that when a unit pressure exists below diaphragm 146 equal to say half of the unit pressure above diaphragm 144, which corresponds to the pressure in slide valve chamber 114, the by-pass valve will close. By this operation, approximately half the original pressure is reestablished in the brake cylinder, after the slipping wheels commence to pick up speed, at a high rate, and as soon as the by-pass valve closes the rate is reduced, so as to reduce the possibility of wheel slipping occurring again.

Now as the fluid pressure is again building up in the brake cylinder the wheels are at the same time gaining speed. As soon as the shaft 18 and the fly wheel body are urged at substantially the same speed, i. e., when there is no tendency of one to overspeed the other, contacts 26 will be opened, whereupon relay 180 will be deenergized, and contacts 182 will again be closed. Closing of contacts 182 will not, however, energize electromagnet 155, because when the electromagnet was deenergized it opened contacts 183, which opened the circuit thereto.

Release valve 160 will therefore remain seated and supply valve 166 unseated, so that fluid under pressure will continue to be resupplied to the brake cylinder, first at a rapid rate, when valve 138 is unseated, and then at a slow rate, when valve 138 is seated. The size of the restricted port 152 may be selected so that the full initial brake cylinder pressure which caused wheel slipping will not be reached before the vehicle or train has stopped. Or, if desired, this port may be made such that the full initial brake cylinder pressure will be produced well before coming to a stop, so that the device will cycle at least two or three times before a stop is made.

If the latter course is adopted, the wheels will undoubtedly slip each time a brake cylinder pressure is reached at or near the initial brake cylinder pressure. When slipping occurs due to the resupply to the brake cylinder, contacts 24 will of course again be closed, thereby energizing electromagnet 134.

When this electromagnet is energized, it will cause a movable contact 190 to engage stationary contacts 192. Engagement of these contacts completes a circuit to the electromagnet 155, whereupon supply valve 166 is seated and release valve 160 unseated. The supply of fluid under pressure will, therefore, be cut off from the supply reservoir 168, and fluid pressure in the brake cylinder will be again released to the atmosphere.

It will thus be seen that the parts may be adjusted so that only one cycle of operation takes place during a stop, or so that several cycles may take place, depending upon what is thought best for a particular set of operating conditions. It is to be understood that the inertia operated device is operable whenever wheel slipping occurs, or whenever a desired maximum rate of retardation is exceeded, whether occurring during a service application or an emergency application of the brakes.

At any time the operator wishes to release fluid pressure from the brake cylinder manually, he may do so by moving the handle of the brake valve device 118 to release position. In this position fluid under pressure in the slide valve chamber 114, and piston chamber 124 to the right of piston 122, will flow to the atmosphere, and that in the brake cylinder will unseat a ball check valve 194 and also flow to the atmosphere.

It will thus be seen that I have provided a means for either limiting the rate of retardation, or for detecting and relieving wheel slipping or sliding. While the embodiment shown in Fig. 1 has been particularly directed to the giving of warning to an operator, and that in Fig. 3 to relieving wheel slipping or sliding, it will be quite apparent that these two embodiments may be combined so that warning may be given to the operator, the rails sanded, and slipping or sliding of wheels detected and relieved, all simultaneously.

Further, while the two embodiments shown relate particularly to the deceleration of a vehicle or train, it will be apparent that the inertia controlled device may be adapted in various ways to controlling the acceleration of a vehicle or train. I, therefore, do not wish to be limited to the particular embodiments shown, or otherwise than by the spirit and scope of the appended claims.

Having now described my invention, what I claim as new and desire to secure by Letters Patent, is:

1. In a vehicle brake apparatus, the combination with a whistle device and a sanding device, of electro-responsive means for controlling operation of said devices, an inertia operated device operated according to the rate of retardation of the vehicle regardless of the speed of the vehicle, and means responsive to operation of said device at one rate of retardation for energizing said electro-responsive means, and means responsive to operation of said device at a different rate of retardation for deenergizing said electro-responsive means.

2. In combination on a railway vehicle, two normally open sets of contacts, means responsive to changes in the rate of speed of a vehicle wheel for closing a first set of said contacts when the rate of deceleration of the wheel exceeds a given value and for closing a second set of said contacts when the wheel ceases to decelerate and accelerates in speed, a first normally deenergized magnet, means for energizing said first magnet when said first set of contacts is closed, a third normally open set of contacts closable when said first magnet is energized, a second normally deenergized magnet, means for closing said second magnet when and only when said second and third sets of contacts are closed, and signaling means on said vehicle controlled by said magnets.

3. In combination on a railway vehicle, two normally open sets of contacts, means responsive to changes in the rate of speed of a vehicle wheel for closing the first set of said contacts when the rate of deceleration of the wheel exceeds a given value and for closing the second set of said contacts when the vehicle wheel ceases decelerating and accelerates at a given rate, a first normally deenergized magnet, means for energizing said first magnet when said first set of contacts is closed, a third normally open set of contacts closable when said first magnet is energized, a normally deenergized relay, means for energizing said relay when and only when said second set of contacts is closed, a third magnet, a pick-up circuit for said third magnet including said third set of contacts, a holding circuit for said third magnet closable when said third magnet is energized and said relay is deenergized, and braking means for the vehicle controlled at least in part by said magnets.

4. In a vehicle brake system, in combination, a brake cylinder, a valve device having a movable abutment subject on one side to pressure from a first chamber and subject on the other side to pressure from a second chamber and operable to application position to supply fluid under pressure to the brake cylinder when the pressure in said first chamber overbalances the pressure in said second chamber, means for supplying fluid under pressure to said first chamber to actuate said valve device to application position, a retardation controller device operated according to the rate of retardation of a vehicle wheel, and means responsive to operation of said retardation controller device at a chosen rate of retardation of said wheel for supplying fluid under pressure to said second chamber to cause said valve device to be actuated to release position to cut off the supply of fluid under pressure to the brake cylinder and to release fluid under pressure from the brake cylinder.

5. In a vehicle brake system, in combination, a control mechanism having two bodies normally rotatable at the same speed and means coupling said bodies providing for relative rotation therebetween in a first direction upon slipping or sliding of one or more vehicle wheels, and relative rotation in an opposite direction upon subsequent increase in the speed of the sliding wheels, a signal device, a sanding device for sanding the rails, electroresponsive means operable when energized to effect operation of said signal device and said sanding device, and means for energizing said electroresponsive means upon differential rotation between said bodies in said first direction and for deenergizing said electroresponsive means upon relative rotation in said opposite direction.

6. In a vehicle brake system, in combination, a brake cylinder, means for supplying fluid under pressure to the brake cylinder, a plurality of sets of contacts, means responsive to the slipping of a vehicle wheel due to application of the brakes for operating a first set of said contacts and operative when the slipping of said wheel ceases and said wheel increases in speed toward that corresponding to the speed of the vehicle for operating a second set of said contacts, means responsive to the operation of said first set of contacts for cutting off the supply of fluid under pressure to the brake cylinder and for releasing fluid under pressure from the brake cylinder, and separate means responsive to the operation of said second set of contacts for terminating the said release from the brake cylinder and for effecting a re-supply of fluid under pressure to the brake cylinder.

7. In a vehicle brake system, in combination, a brake cylinder, means for supplying fluid under pressure to the brake cylinder, two sets of contacts, means responsive to the slipping of a vehicle wheel due to application of the brakes for operating a first set of said contacts and automatically operative when said wheel ceases to slip and increases in speed toward that corresponding to the speed of the vehicle for operating a second set of said contacts, means responsive to the operation of said first set of contacts for cutting off the supply to the brake cylinder and for releasing fluid under pressure from the brake cylinder, separate means responsive to operation of said second set of contacts for terminating said release from the brake cylinder and for re-supplying fluid under pressure to the brake cylinder, and means responsive to the pressure of fluid re-supplied to the brake cylinder for varying the rate at which fluid under pressure flows to the brake cylinder.

8. In a vehicle brake system, in combination, a brake cylinder, means for supplying fluid under pressure to the brake cylinder to effect an application of the brakes, a member rotatable according to the speed of a vehicle wheel, a second member driven by said first member and being adapted to move in a rotative direction relative to said first member when urged at a greater or lesser speed than the speed of rotation of said first member, means operative upon relative movement of said second member with respect to said first member due to slipping of the wheel associated with said first member for cutting off the supply of fluid under pressure to the brake cylinder and for releasing fluid under pressure from the brake cylinder, and means operative upon movement of said first member with respect to said second member due to an increase in the speed of the vehicle wheel upon termination of the slipping thereof for terminating the release of pressure from said brake cylinder and for effecting a re-supply of fluid under pressure to the brake cylinder.

9. In a vehicle brake system, in combination, a brake cylinder, means for supplying fluid under pressure to the brake cylinder, an inertia device operated according to the rate of retardation of a vehicle wheel, means responsive to an operation of said inertia device due to a slipping of said vehicle wheel for cutting off the supply to the brake cylinder, means responsive to an operation of said inertia device due to an increase in the speed of the vehicle wheel upon termination of the slipping condition for effecting a re-supply of fluid under pressure to the brake cylinder, and means for controlling the rate of said re-supply.

10. In a vehicle brake system, in combination, a brake cylinder, means for supplying fluid under pressure to the brake cylinder, two normally open sets of contacts, means operative upon slipping of a vehicle wheel due to application of the brakes for closing a first set of said contacts and operative when the wheel increases in speed toward that corresponding to the speed of the vehicle following termination of the wheel slipping condition for closing said second set of contacts, means responsive to closing of said first set of contacts for cutting off the supply of fluid under pressure to the brake cylinder and for establishing a communication through which fluid under pressure is released from the brake cylinder, means responsive to the closing of said second set of contacts for closing said communication to the atmosphere and for connecting said communication to a source of fluid under pressure to re-supply fluid under pressure to the brake cylinder, and means for controlling the rate of re-supply of fluid under pressure to the brake cylinder.

11. In a vehicle brake system, in combination, fluid pressure brake means, means for supplying fluid under pressure to effect an operation of said brake means, an inertia device operated according to the rate of retardation of a vehicle wheel, means responsive to operation of said inertia device at a chosen rate of retardation of said wheel for cutting off the supply to and effecting a release of fluid under pressure from said brake means, means responsive to operation of said inertia device subsequently due to acceleration of said wheel for effecting a re-supply of fluid under pressure to said brake means, and means for controlling the rate of said re-supply.

12. In a vehicle brake system, in combination, a brake cylinder, means for supplying fluid under pressure to the brake cylinder, an inertia device operated according to the rate of retardation of a vehicle wheel, means responsive to operation of said inertia device at a relatively high rate of retardation which corresponds to slipping of said vehicle wheel for cutting off the supply of fluid under pressure to the brake cylinder, means responsive to operation of said inertia device subsequently due to the rate of retardation of said wheel having diminished for re-supplying fluid under pressure to the brake cylinder, and valve means responsive to the pressure of said re-supply for controlling the rate of re-supply and operable at a predetermined pressure to reduce the rate of re-supply.

13. In a fluid pressure brake system for a single vehicle or a train, in combination, means operative manually to control the application and the release of the brakes, means automatically responsive to the rate of retardation of a vehicle wheel when it begins to slip due to the excessive application of the brakes for causing a reduction in the braking force on and thereby preventing the sliding of said wheel, and means automatically responsive to the increase in the speed of said wheel as it returns to a speed corresponding to that of the vehicle with which it is associated, following relief of the wheel slipping condition, for effecting an increase in the braking force on that wheel.

14. In a fluid pressure brake system for a vehicle or a train, in combination, a brake cylinder, means manually operative to control the supply of fluid under pressure to and the release of fluid under pressure from the brake cylinder to effect, respectively, the application and the release of the brakes, rotary inertia operated means rotated according to the direction and speed of rotation of a vehicle wheel and shifted forwardly and backwardly of the direction of rotation thereof with respect to a normal position in accordance with the rate of retardation and acceleration, respectively, of the vehicle wheel, means controlled by the forward shifting of the inertia means upon the slipping of the vehicle wheel for closing off the supply of fluid under pressure to the brake cylinder and releasing fluid under pressure from the brake cylinder at a rate sufficiently rapid to prevent sliding of the vehicle wheel, and means controlled by the backward shifting of the inertia means as the vehicle wheel accelerates toward the speed corresponding to the speed of the vehicle, following relief of the wheel slipping condition, for again supplying fluid under pressure to the brake cylinder.

15. In a fluid pressure brake system for a vehicle or a train, in combination, a brake cylinder, means manually operative to control the supply of fluid under pressure to and the release of fluid under pressure from the brake cylinder to effect, respectively, the application and the release of the brakes, rotary inertia operated means rotated according to the direction and the speed of rotation of a vehicle wheel and shifted forwardly and backwardly of the direction of rotation thereof from a normal position in accordance with the rate of retardation and acceleration, respectively, of the vehicle wheel, means controlled by the forward shifting of the inertia means upon retardation of the vehicle wheel produced by the application of the brakes for closing off the supply of fluid under pressure to the brake cylinder and releasing fluid under pressure from the brake cylinder to cause a substantial reduction in the rate of retardation of said wheel, a communication through which fluid under pressure is released from the brake cylinder at any time by operation of said manually operative means, and a one-way valve in said communication for preventing the supply of fluid under pressure to the brake cylinder through said communication by operation of said manually operative means.

16. In a vehicle brake system, in combination, a brake cylinder, means for effecting a supply of fluid under pressure to said brake cylinder, wheel slipping detector means operative cyclically so long as said vehicle is in motion to alternately reduce brake cylinder pressure upon slipping of a vehicle wheel, and upon relief of the wheel slipping condition, due to reduction of brake cylinder pressure, to re-supply fluid under pressure to the brake cylinder, and means for controlling the rate of re-supply to said brake cylinder.

17. The method of controlling an application of the brakes, which comprises, effecting an application of the brakes, quickly reducing the degree of application of the brakes when a braked wheel or wheels commence to slip, and increasing the degree of application of the brakes, as the wheel or wheels increase in speed toward normal speed, first at one rate and then at another rate.

18. The method of controlling brake cylinder pressure in a vehicle brake system, which comprises, effecting a supply of fluid under pressure to the brake cylinder to effect an application of the brakes, reducing brake cylinder pressure when a braked wheel or wheels commence to slip, and then increasing brake cylinder pressure first at one rate and then at another rate when the wheel slipping condition is relieved.

19. The method of controlling brake cylinder pressure in a vehicle brake system, which comprises, effecting a supply of fluid under pressure to the brake cylinder to effect an application of the brakes, quickly reducing brake cylinder pressure when a braked wheel or wheels commence to slip, and then when the wheel slipping diminishes first increasing brake cylinder pressure at a rapid rate and then at a slower rate.

20. The method of controlling brake cylinder pressure in a vehicle brake system, which comprises, effecting a supply of fluid under pressure to said brake cylinder, quickly reducing brake cylinder pressure when a braked wheel or wheels commence to slip, re-supplying fluid under pressure to the brake cylinder when the wheel slipping condition has been relieved, and controlling the rate of re-supply to the brake cylinder by the pressure of the re-supply.

21. The method of controlling an application of the brakes, which comprises, effecting an application of the brakes, reducing the degree of the application, when a braked wheel or wheels commence to slip, at a rate sufficiently rapid to permit the wheel or wheels to increase in speed toward that corresponding to vehicle speed, increasing the degree of the application upon the increase in speed of said wheel or wheels, and so controlling the increase in the degree of the application as to cause said wheel or wheels to produce the maximum possible retarding effort consistent with minimum danger of a wheel slipping.

22. The method of controlling an application of the brakes substantially as set forth in the preceding claim, except limited to controlling the brakes of a fluid pressure brake system.

23. In a vehicle brake system, in combination, a brake cylinder, means for supplying fluid under pressure to the brake cylinder, a member rotatable according to the speed of the vehicle, a second member, friction means establishing a clutch between said first and second members whereby said second member may be driven by said first member and may underspeed or overspeed said first member when urged at a lesser or greater speed than the speed of rotation of said first member, a third member driven by said second member and adapted to urge said second member to underspeed or overspeed said first member, means providing for relative rotational movement between said second and third members when the speed of rotation of said first member is varied, and means responsive to relative rotational movement between said second and third members for controlling brake cylinder pressure.

24. In a vehicle brake system, in combination, means for effecting an application of the brakes, a plurality of rotatable bodies a first of which is adapted to be rotated according to the speed of rotation of a vehicle wheel or axle, friction means providing a clutch between said first body and a second of said bodies, said friction means being adapted to permit said second body to underspeed or overspeed said first body, means providing for relative rotation movement between said second body and a third of said bodies, and means controlled by and in response to the relative rotational movement between said second and third bodies for controlling the degree of application of the brakes.

25. In a control device for controlling the application of vehicle brakes, in combination, a first rotatable member adapted to be driven at a speed corresponding to the speed of a vehicle wheel, a second rotatable member, friction means forming a clutch between said first and second members, a third rotatable member, means providing for rotation of said third member by said second member and for relative rotational movement between said second and third members, and vehicle brake control means actuated upon relative rotational movement between said second and third members.

26. In a vehicle brake system, in combination, a brake cylinder, means operative subsequent to the establishment of fluid under pressure in said brake cylinder for establishing a communication through which fluid under pressure in the brake cylinder is released to the atmosphere, means operative to terminate the release of fluid under pressure from said brake cylinder through said communication, and operative to resupply fluid under pressure to the brake cylinder through said communication, and valve means controlled by the pressure of said resupply for controlling the rate of resupply to the brake cylinder.

27. In a vehicle brake system, in combination, a brake cylinder, means operative subsequent to the establishment of fluid under pressure in said brake cylinder for establishing a communication through which fluid under pressure in the brake cylinder is released to the atmosphere, means operative to terminate the release of fluid under pressure from said brake cylinder through said communication and to resupply fluid under pressure to the brake cylinder through said communication, and valve means operative to permit resupply of fluid under pressure through said communication to said brake cylinder at an unrestricted rate up to a predetermined brake cylinder pressure, and operative thereof to permit resupply to said brake cylinder only at a restricted rate.

28. In a vehicle brake system, in combination, a brake cylinder, means operative subsequent to the establishment of fluid under pressure in said brake cylinder for establishing a communication through which fluid under pressure in the brake cylinder is released to the atmosphere, means operative to terminate the release of fluid under pressure from said brake cylinder through said communication and to resupply fluid under pressure to the brake cylinder through said communication, and valve means having an unrestricted port and a restricted port arranged in parallel for controlling the resupply of fluid under pressure to said brake cylinder, and being operative at a predetermined pressure of said resupply to close said unrestricted port while maintaining the restricted port open.

29. In a vehicle brake system, in combination, means for controlling the application of the brakes to produce a chosen degree of braking, and operative to also effect a release of the brakes, means operative upon slipping of a vehicle wheel due to effecting an application of the brakes to said chosen degree for so reducing the degree of the application on the slipping wheel as to prevent sliding thereof, and means automatically operative upon relief of the wheel slipping condition for effecting reapplication of the brakes on the wheel which slipped, said means being adaptable to limit the degree of the reapplication, while the vehicle is in motion, to a value which is substantially less than said chosen degree.

30. In a brake system for a car or train, in combination, manually controlled means for effecting application and release of the brakes on the car or train, means operated automatically during an application of the brakes in response to the rotative deceleration of a car wheel at a rate in excess of a certain rate for initiating release of the brakes associated with said wheel, and means operated automatically during an application of the brakes in response to the rotative acceleration of the said wheel at a rate in excess of a certain rate for terminating the release of the brakes associated with said wheel and for then initiating reapplication of the said brakes.

31. In a fluid pressure brake equipment for a car or train, in combination, a brake cylinder operative upon supply of fluid under pressure thereto to effect application of the brakes associated with a car wheel and upon the release of fluid pressure therefrom to effect the release of the brakes, manually controlled means for effecting supply of fluid under pressure to and release of fluid under pressure from said brake cylinder, means automatically operative during an application of the brakes in response to a predetermined rate of rotative deceleration of said wheel for initiating release of fluid under pressure from said brake cylinder, and means automatically operative during an application of the brakes to maintain the release of fluid under pressure from said brake cylinder until the said wheel has ceased decelerating and has attained a predetermined rate of accelerative rotation, and for then terminating the release of fluid under pressure from and initiating a resupply of fluid under pressure to the brake cylinder.

32. In a brake system for a car or train having manually controlled means for causing application and release of the brakes associated with a car wheel, rotary inertia means rotatable with the car wheel, said inertia means having a normal position with respect to said wheel and being shiftable rotatively forward and backward from said normal position upon deceleration and acceleration respectively of said wheel, in combination, means operative during an application of the brakes in response to the shifting of said inertia element forwardly of its normal position for initiating release of the brakes associated with said wheel, and means operative to continue said release of the brakes until said inertia device has shifted backwardly of its normal position and for then terminating the release and initiating reapplication of the brakes.

33. A fluid pressure brake system for a car or train comprising, in combination, a brake cylinder operative upon supply of fluid under pressure thereto to effect application of the brakes and upon release of fluid under pressure therefrom to effect release of the brakes, two sources of fluid under pressure, manually controlled means for effecting supply of fluid under pressure from one of said sources to said brake cylinder to initially effect an application of the brakes, and means automatically operative in response to a predetermined rate of deceleration of said wheel incident to slipping thereof for effecting release of fluid under pressure from said brake cylinder and subsequently responsive to a predetermined rate of acceleration of the wheel following relief of the wheel slipping condition for effecting resupply of fluid under pressure thereto from the other of said two reservoirs.

JOSEPH C. McCUNE.